US00RE42977E

(19) United States
(12) Reissued Patent
Maziere et al.

(10) Patent Number: US RE42,977 E
(45) Date of Reissued Patent: Nov. 29, 2011

(54) METHOD FOR SEGMENTING A VIDEO IMAGE INTO ELEMENTARY OBJECTS

(75) Inventors: Magali Maziere, Valbonne (FR); Françoise Chassaing, Rennes (FR); Henri Sanson, Acigne (FR)

(73) Assignee: Gula Consulting Limited Liability Company, Dover, DE (US)

(21) Appl. No.: 12/355,565

(22) PCT Filed: Sep. 6, 2001

(86) PCT No.: PCT/FR01/02771

§ 371 (c)(1),
(2), (4) Date: Mar. 7, 2003

(87) PCT Pub. No.: WO02/21444

PCT Pub. Date: Mar. 14, 2002

Related U.S. Patent Documents

Reissue of:
(64) Patent No.: 7,164,718
Issued: Jan. 16, 2007
Appl. No.: 10/363,795
Filed: Mar. 7, 2003

(30) Foreign Application Priority Data

Sep. 7, 2000 (FR) ..... 00 11404

(51) Int. Cl.
*H04B 1/66* (2006.01)
*H04N 7/26* (2006.01)

(52) U.S. Cl. ..... 375/240.16

(58) Field of Classification Search ..... 375/240.16, 375/240.1; 348/234, 236, 419.1, 416.1; 382/234, 382/236

See application file for complete search history.

(56) References Cited

U.S. PATENT DOCUMENTS 5,706,419 A 1/1998 Matsugu et al.
5,999,651 A 12/1999 Chang et al.
6,031,935 A 2/2000 Kimmel (Continued)

FOREIGN PATENT DOCUMENTS

EP 000959625 A2 * 11/1999

(Continued)

OTHER PUBLICATIONS

Office Action for JP App. 2002-525579 mailed Dec. 14, 2010.

(Continued)

*Primary Examiner* — Tung Vo
(74) *Attorney, Agent, or Firm* — Schwabe, Williamson & Wyatt, P.C.

(57) ABSTRACT

A starting contour is defined surrounding around an elementary object delimited by a natural contour in a video image. On the basis of the starting contour, an original active contour is defined, formed by a set of nodes distributed on this starting contour, each node being formed by a point belonging to this starting contour and by an elastic energy function representative of the distance separating this node from a neighbouring node. With regards to a set of reference values representative of the contour of this object, the active contour is subjected to a convergent deformation under a blocking condition, by displacing at least one of the nodes of the original active contour toward the natural contour of the elementary object to generate a current active contour iteratively subjected to this convergent deformation.

25 Claims, 10 Drawing Sheets

U.S. PATENT DOCUMENTS

| | | | | |
|---|---|---|---|---|
| 6,400,831 | B2 * | 6/2002 | Lee et al. | 382/103 |
| 6,480,615 | B1 | 11/2002 | Sun et al. | |
| 6,560,281 | B1 * | 5/2003 | Black et al. | 375/240 |
| 6,804,394 | B1 * | 10/2004 | Hsu | 382/173 |
| 7,010,567 | B1 * | 3/2006 | Mori | 709/203 |

FOREIGN PATENT DOCUMENTS

| | | | |
|---|---|---|---|
| EP | 959625 | A2 | 11/1999 |
| EP | 1 014 303 | A1 | 6/2000 |
| EP | 1014303 | A | 6/2000 |

OTHER PUBLICATIONS

International Search Report for PCT App. PCT/FR01/02771.

Kass et al., "Snakes: Active Contour Models," International Journal of Computer Vision, 1, pp. 321-331 (1998).

Office Action mailed Apr. 4, 2006 for U.S. Appl. No. 10/363,795.

Office Action mailed Apr. 19, 2006 for U.S. Appl. No. 10/363,795.

Notice of Allowance mailed Sep. 26, 2006 for U.S. Appl. No. 10/363,795.

Office Action mailed Aug. 17, 2010 for JP App. 2002-525579.

Office Action, issued in Japanese Patent Application No. 2002-525579, mailed May 24, 2011, 3 pages.

* cited by examiner

FIG.3a.
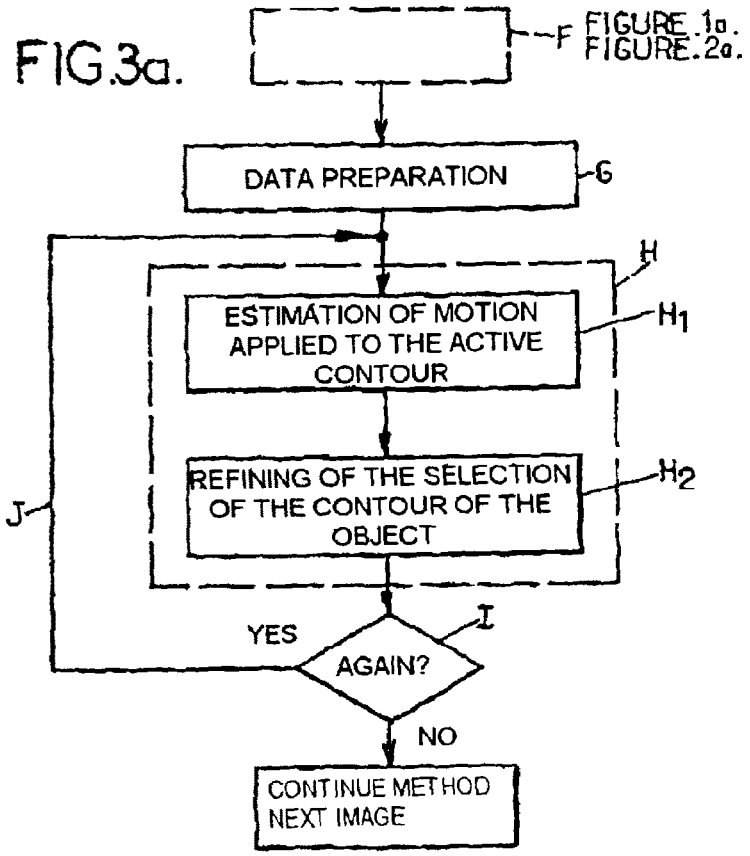
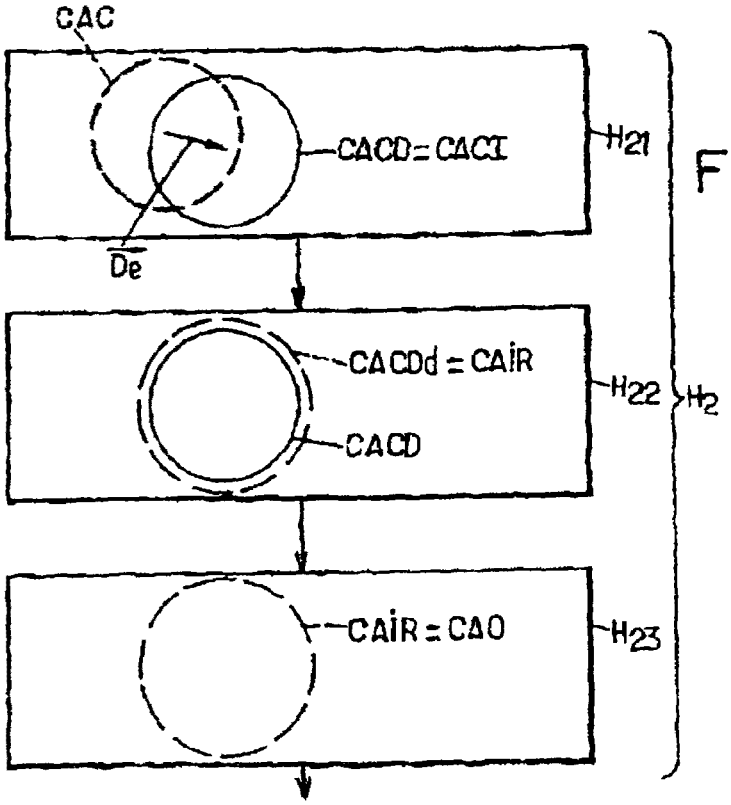
FIG.3b.

METHOD FOR SEGMENTING A VIDEO IMAGE INTO ELEMENTARY OBJECTS

Matter enclosed in heavy brackets [ ] appears in the original patent but forms no part of this reissue specification; matter printed in italics indicates the additions made by reissue.

BACKGROUND OF THE INVENTION

The invention relates to a method for segmenting a video image based on elementary objects.

At present, it is completely impossible to reproduce the functioning of the human visual and cognitive system using procedures for segmenting video images based on elementary objects emanating from computer-based vision processes. Specifically, the resulting image obtained by virtue of the implementation of the aforesaid processes is under-segmented or over-segmented. In neither case do these procedures allow automatic reproduction of the ideal segmentation carried out by a human operator.

Nevertheless, numerous applications have recourse to segmentation, which, in order to appear ideal, ought to be robust, fast, discriminating and nonspecific to a particular field of application. More particularly, the automatic following or calculation, with a view to the acquisition and tracking, of the trace of an object over time in a succession of video images remains a completely open problem, all the more so when the object may deform via complex transformations over time, natural or artificial transformations such as "morphing".

Among the image segmentation procedures proposed hitherto, several families are customarily distinguished.

A first family corresponds to the conventional segmentation procedures based on filtering, mathematical morphology, region growth, partition of color histograms, Markov procedures. These automatic procedures are applied to an image but the results obtained depend strongly on the particular content of the image and are sensitive to the texture of the image. They do not allow segmentation of the image based on elementary objects in so far as it is difficult to retrieve the contours of an object of interest. The images are over-segmented and the contours detected do not all form a closed list, substantially guaranteeing the integrity of the contour of the object of interest and the segmentation of the latter. The scatter in the results is large between the various procedures and the results are not very robust, two very similar images possibly culminating in a very different segmentation and vice versa one and the same image possibly culminating in a very different segmentation with two procedures.

A second family groups together procedures based on mathematical morphology and which try to remedy the problems and the drawbacks of the procedures of the first family using processes based on a tree structure, a binary partition tree making it possible to characterize the content of the images. Such a tree structure describing the spatial organization of the image is obtained by iteratively merging neighboring regions according to a homogeneity criterion until a single region is obtained. The tree is constructed by preserving the trace of merged regions at each iteration of the process. This procedure offers the possibility of manually marking regions of interest on the original image and of retrieving nodes corresponding to this marking from the partition tree. The drawbacks of the procedures of this family reside in the fact that the entire image is segmented, that it is necessary to have prior knowledge of the number of regions constituting the object, and that the contours of the object which are obtained are not accurate enough or are not the right ones. Specifically, it often happens that the object of interest straddles several regions, the contours of the object, in such a case, therefore not corresponding to the contours of these regions.

A third family groups together statistical procedures based on Markov fields. These procedures carry out a tagging of the regions of the image according to a criterion to be maximized. They can take account of a wide set of a priori information about the image and are particularly suited to satellite images composed of textured and juxtaposed zones.

A fourth family relates to active contour procedures also designated snake. In this type of procedure, described in the article entitled "Snake: Active Contour Models", published by M KASS, A. WITKIN and D. TERZOPOULOS in the International Journal of Computer Vision, vol. 1, pp. 321-332, 1998, the principle consists in iteratively deforming an initial curve until it hugs the content of the object, by minimizing an energy functional.

This energy is composed of two terms:

- the internal energy of the contour, which energy depends on the intrinsic or geometrical properties of the active contour, such as length, curvature, etc. This internal energy term allows a contraction of the active contour around the object and causes a displacement of the latter's nodes in a direction which locally minimizes the energy;
- the energy external to the contour, which energy corresponds to a term bound to the data. This external energy term is generally linked with the contours present in an image and slows down the contraction of the active contour around these contours present.

It is noted in particular that this family of procedures involves a priori knowledge of the contours present in the image, something which, of itself, can be achieved only by virtue of a priori analysis of the image.

A fifth family of procedures corresponds to a development of the procedure of the previous family, in which development, as far as the external forces applied to the active contour are concerned, the model behaves like a balloon inflating under the effect of the aforesaid forces and stops when it encounters marked or predefined contours. Thus, the active contour can overstep contours which are not very marked. Other developments have proposed the use of deformable geometric active contours. These developments use level sets allowing automatic management of the changes of topology of the active contour. However, the procedures of the aforesaid family necessarily require an initialization which is close to the final solution, that is to say to the natural contour of the object, in order to obtain good convergence of the algorithm.

A sixth family of procedures is based on the definition of regions of the image, by prior estimation of these regions and of the background of the image. The curve of the evolution of the active contour is generally defined by deriving a criterion in the distributions sense. This criterion depends on constraints relating to two sets: the background of the image and the objects in motion. The evolution curve can comprise the following three terms:

- a term bound to the data;
- a hyperbolic term, allowing adaptation to the shape of the objects, and
- a parabolic term stabilizing the solution by smoothing the contours.

The direction of motion of the active contour varies over time, allowing the active contour to dilate or, conversely, to contract at certain nodes. However, these procedures require a labeling of the background of the image and the execution time remains too large, of the order of several minutes, for dynamic applications to moving objects of video images.

As far as the procedures for following objects in the image are concerned, also known as tracking procedures, various families of procedures are currently proposed.

A first family calls upon a meshing technique. According to a first procedure of this family, a hierarchical meshing structure successively estimates the dominant motion of the object, then the latter's internal motions. A hierarchy of meshes is generated from the mask of the object defining a polygonal envelope of this object. Before commencing the hierarchical cycle of motion estimation, an affine global model initializing the coarse mesh of the hierarchy is estimated. This estimation is then propagated to the finest levels where a global estimation is carried out. It sometimes happens that a node strays from the natural contour of the object and attaches itself to the background of the scene, dragging its neighboring nodes with it. This dragging process is linked to a temporal accumulation of errors of positioning of the nodes, since only the initial segmentation is available during optimization. To remedy the aforesaid dragging process, a solution has been proposed which consists in furthermore injecting a procedure much like the active contours procedure. Active contours are generated from the finest mesh of the hierarchization cycle and they evolve over the contours emanating from the segmented current image. These active contours are injected after the first estimation of the motion so as to constrain the vertices of the edges of the mesh to reposition themselves on the outer contours of the object. This solution has not however, been adopted, since the mesh structure is then very complex to use.

A second family calls upon the implementation of active contours, according to the procedures described above. The active contour obtained on the current image is propagated from one image to the next and deforms so as to hug the contours of the object of interest on the successive images. Motion constraints can be added during the minimization of the energy functional.

These procedures can furthermore combine procedures for estimating parameters based on optical flow or based on a model of motion, such as translation, affine transformation, perspective, bilinear deformation or the like, and active contour procedures, with the aim of making object tracking or following more robust. In a specific example, the object following procedure combines an active contour procedure and an analysis of the motion based on regions of the image. The motion of the object is detected by a motion-based segmentation algorithm. An active contour model is then used with the aim of following and segmenting the object. Thereafter, the motion of the region defined inside the active contour is then estimated by a multi-resolution approach based on an affine model. A Kalman filter is used to predict the position of the aforesaid region and hence to initialize the active contour in the next image.

A third family of procedures calls upon techniques based on tag maps, which utilize the image partitioning processes, or tag maps over the pixels of an image. In a first procedure, a technique combining information regarding motion and spatial organization over the images has been proposed with the aim of following an object. The current image is partitioned by a mathematical morphology procedure and the resulting image is compensated by the motion vectors estimated coarsely by a block matching algorithm. The spatial homogeneity of the regions or markers is verified thereafter. These procedures have the limitations of conventional active contour procedures, in particular slowness of convergence.

A second procedure is based on the technique of Markov fields. This procedure comprises a procedure for segmenting an image into regions which are homogeneous in the motion sense by statistical tagging. The partition is obtained according to a criterion of intensity, color and texture.

A third procedure carries out a spatial segmentation of the image into homogeneous regions and tracking is carried out by a back-projection procedure. This involves determining the mask of the object of interest on the current image. Each region of the segmented current image is then back-projected according to the motion onto the previous segmented image. The back-projected regions belonging to the mask of the object then form the new mask of the object on the current image. These procedures have the drawback of yielding rather inaccurate object contours. Specifically, holes or artefacts appear, because of the use of an initial segmentation of the image.

SUMMARY OF THE INVENTION

The object of the present invention is to remedy the drawbacks of the aforesaid techniques of the prior art, both as regards the image segmentation process and the tracking or following of an object in motion over successive images.

In particular, an object of the present invention is the implementation of a method for segmenting a video image based on elementary objects in which method no a priori knowledge about the image is required.

Another object of the present invention is, on account of the absence of a priori knowledge about the image, the implementation of a method of segmentation based on active contours of a video image based on elementary objects, in which the starting active contour, also designated the starting contour, is arbitrary with regard to an elementary object of interest belonging to the image.

Another object of the present invention is also, having regard to the initialization of the method which is the subject of the present invention from an arbitrary starting active contour, the implementation of a method for segmenting a video image which is extremely flexible to use and is extremely tolerant to the selection of an inexperienced user, the starting contour possibly containing several loops, in the absence of any necessary orientation.

Another object of the present invention is also the implementation of a method for segmenting an image based on active contours, in which, all a priori knowledge about the image having been deleted, the external energy term is consequently deleted, thereby making it possible to obtain very fast convergence of the current active contour to the natural contour of the elementary object of interest.

Another object of the present invention is also the implementation of a method for segmenting an image based on active contours, in which, on account of the absence of a priori knowledge about the image, a better tolerance to noise and to poorly defined image contours is obtained.

Another object of the present invention is also the implementation of a method for segmenting an image based on active contours, in which, on account of the tolerance of a starting contour to several loops, the segmentation of the image with regard to at least one elementary object having several components can be implemented, thereby conferring a high degree of flexibility of use on the method which is the subject of the present invention.

Another object of the present invention is the implementation of a method for segmenting a video image based on elementary objects, in which the speed of convergence of the starting contour to the natural contour of the elementary object of interest in the image permits high stability of the process of segmentation in each image, and, consequently, stable tracking or following of moving objects over successive images, thereby making it possible to obtain very robust tracking of a moving object of interest over a large number of successive images.

In particular, another object of the present invention is also the implementation of a method for segmenting a video image based on elementary objects, in which, on account of the speed of convergence of the active contours, of the robustness in the following of the moving objects and of the tolerated subdividing of an active contour into several active contours, each active contour resulting from such a subdivision evolves independently since it is linked only to the subdivision of the elementary object of interest.

Another object of the present invention is finally the implementation of a method for segmenting a video image based on elementary objects, in which, by virtue of a simplified motion following process, the convergence of the current active contour to the motion of the mobile elementary object of interest is accelerated.

The method for segmenting a video image based on elementary objects, which is the subject of the present invention, is noteworthy in that it consists, with regard to at least one elementary object delimited by a natural contour of this video image:

in defining, around this elementary object, a starting contour completely surrounding said elementary object;

in defining, on the basis of said starting contour, an original active contour, formed by a set of nodes distributed on this starting contour, each node being formed by a point belonging to this starting contour and by an elastic energy function representative of the distance separating this node from a neighboring node;

in subjecting, with regard to a set of reference values which are representative of the natural contour of this elementary object, the original active contour to a convergent deformation under a blocking condition which determines whether the contour is reached, by displacing toward the natural contour of the elementary object at least one of the nodes of the original active contour, so as to generate a current active contour, this current active contour being subjected iteratively to this convergent deformation so as to generate distinct successive current active contours as long as this displacement satisfies the non-blocking condition and in halting any nodal displacement of this current active contour otherwise. This makes it possible to generate a final current active contour substantially reproducing the natural contour of the elementary object.

The method which is the subject of the present invention can in a particularly advantageous manner be implemented on the basis of program modules and finds application to all processing of video images involving object-based segmentation and for which a coarse but reliable preselection of the object to be segmented can be achieved.

Among the applications which can be envisaged, mention may be made, nonlimitingly, of applications linked:

to the new multimedia services distributed over remote networks, such as the World Wide Web or local area networks, services such as image or video searching, in the case of the archiving of audiovisual production. The attraction of such services is connected, on the one hand, with the quality of restitution of the contents, and, on the other hand, with the power of the search engine, well suited to the nature of the broadcast media. Specifically, it may be noted that increasing the amount of information available is not sufficient since it becomes crucial to make access to it easier;

to audiovisual production; modern techniques of audiovisual production are calling evermore upon the composition of various backgrounds and of foreground video objects in order to construct film scenes or television scenes. At present, the shooting of video objects is a particularly unwieldy operation, requiring recourse to the chroma-key technique, this technique making it necessary in particular to film any object of interest on a uniform background of known color. The method which is the subject of the present invention, allowing particularly flexible and fast segmentation of images based on elementary objects, allows production costs to be greatly reduced;

to interactive television, also designated enhanced television, a field in which, by virtue of the method which is the subject of the present invention and on account of its flexibility and robustness, over a large number of images of mobile objects, it is possible to select an object or an actor present on the screen, to follow the latter over time, during the unfolding of the action, and to have available multimedia information about this object or this actor;

to tools for creating multimedia content satisfying the MPEG-4 standard. The aforesaid standard does not provide any procedure for segmenting images based on elementary objects. The method which is the subject of the present invention makes it possible to introduce a segmentation process, a natural extension of such an environment;

to videophony. When the transmission throughput becomes too limited, on account of the congestion of the transmission networks, it is of the greatest interest to concentrate the visual information transmitted, and hence the throughput available to ensure the routing thereof, on objects or image zones carrying most information, in particular the face of the people speaking, the aforesaid concentration being implementable by virtue of the segmentation method which is the subject of the present invention;

to video conferencing services, where, in addition to the applications inherent to videophony, the applications in which one seeks an increase in the visual sensation of presence by synthetic reconstruction of a virtual meeting gathering together in one and the same virtual place all the participants to the video conference are made easier, by virtue of the segmentation method which is the subject of the present invention.

DESCRIPTION OF THE DRAWINGS

The method which is the subject of the present invention will be better understood on reading the description and on looking at the drawings hereinbelow in which:

FIG. 3a, represents, by way of illustration, a general flowchart of a motion estimation process applied to a current active contour in accordance with the method which is the subject of the present invention and making it possible to ensure the tracking of a moving object over a plurality of successive images, such as video or television images;

FIG. 3b represents, by way of illustration, a preferred non-limiting mode of carrying out a step of refining the current active contour relating to an object in motion such as represented in FIG. 3a;

The method for segmenting a video image based on elementary objects, which is the subject of the present invention, will now be described in conjunction with FIG. 1a and the subsequent figures.

In a general manner, it is recalled that the method which is the subject of the present invention is implemented on the basis of at least one image IM, such as a video image, but preferably on the basis of a sequence of images comprising at least one elementary object, denoted OBJ, animate or inanimate and delimited by a natural contour CN.

The method which is the subject of the present invention is based on the fact that any elementary object OBJ present in an image, in particular a video image, has a natural contour CN whose trace is manifested on the relevant image by luminous intensity values exhibiting substantially a discontinuity all along the latter, this discontinuity having the effect of introducing a concept of differential intensity with regard to the object itself or the direct environment of this object, and, in particular, a luminous intensity gradient value over the natural contour of the object, and hence over this trace, exhibiting a substantially stable value.

The method which is the subject of the present invention, having regard to the aforesaid remark, thus has the object, based on a starting contour which is absolutely arbitrary but which surrounds this object, of searching, by deformation of this starting contour, by contraction of the latter to the aforesaid object, for a positional stability of the active contour on the natural contour of the object.

Figure 1A:
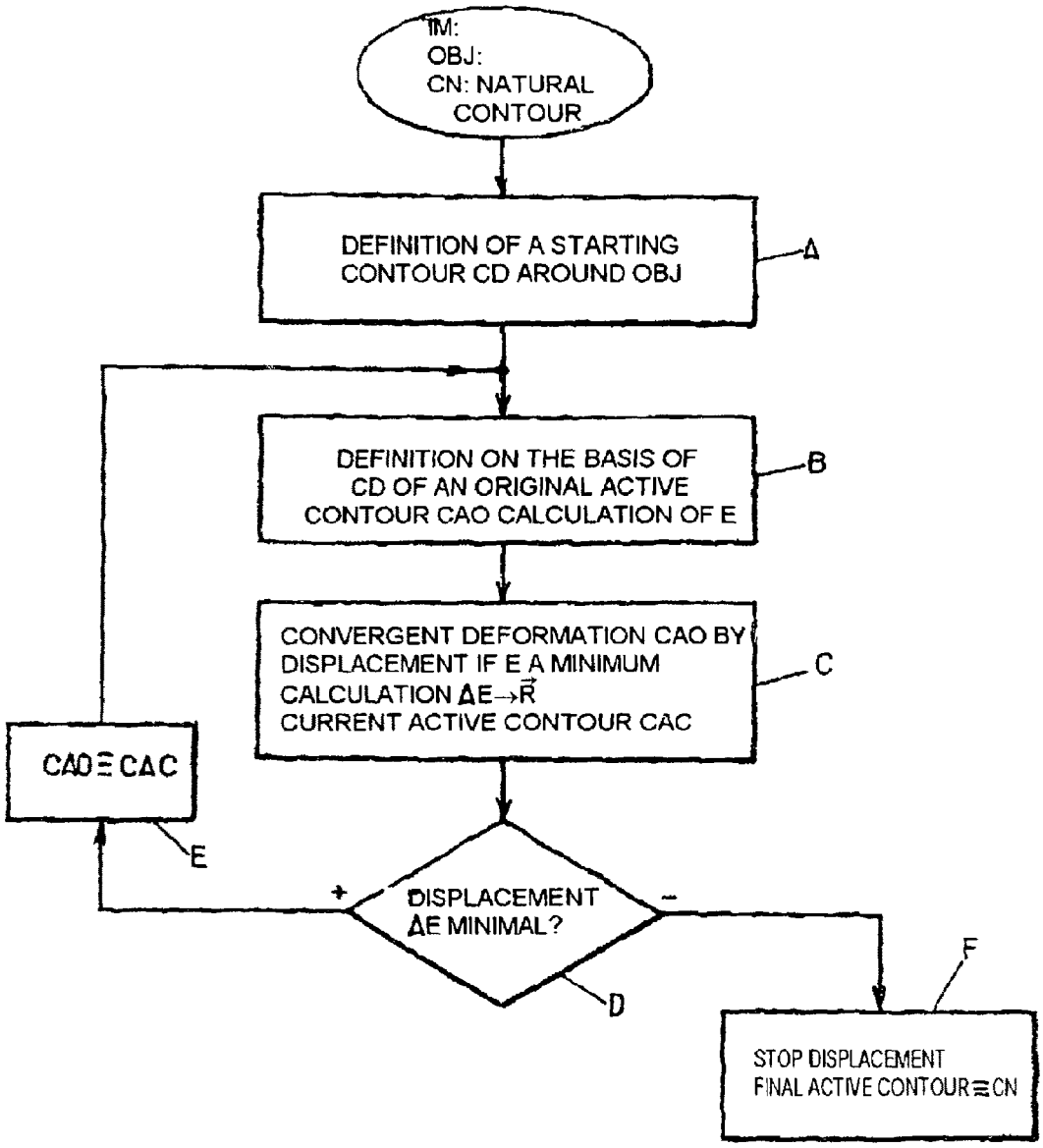
FIG. 1a represents, by way of illustration, a general flowchart of the steps allowing the implementation of the method which is the subject of the present invention.

With this aim, and as represented in FIG. 1a, on the basis of a video image IM or of a plurality of successive images with regard to an elementary object OBJ exhibiting a natural contour CN at a starting step S, the method which is the subject of the present invention consists, in a step A, in defining around the aforesaid elementary object OBJ, a starting contour, denoted CD, completely surrounding the elementary object OBJ.

As far as the definition of the starting contour CD is concerned, it is indicated of course that the image IM available in the form of a video image, and hence in the form of an image file, can advantageously be displayed on a display system, not represented in the drawing in FIG. 1a, such as a video screen furnished with a graphical interface and with a pointer. Under these conditions, and in a particularly simple manner, the image displayed being on the aforesaid display monitor, a user can easily, on the basis of a pointing device, trace around the object OBJ any starting contour CD surrounding the aforesaid object in the easiest manner.

DESCRIPTION OF THE PREFERRED EMBODIMENTS

The aforesaid step A is then followed by a step B consisting in defining, on the basis of the starting contour CD, an original active contour, denoted CAO, formed by a set of nodes distributed around this starting contour.

The step B is then followed by a step C of convergent deformation of the original active contour CAO by displacing at least one of the points of the original active contour CAO toward the elementary object OBJ, and in particular toward the natural contour of the elementary object.

In accordance with a noteworthy aspect of the method which is the subject of the present invention, the deformation of the original active contour CAO is performed by displacing toward the natural contour of the elementary object at least one of the nodes of the original active contour, this displacement being normal and centripetal to the original contour CAO, dependent on the elastic energy (or spring term) obtained on the basis of the distance of the adjacent nodes from the current node and controlled by a blocking function on the image of the contours, which is obtained from the intensity measured along the segments adjacent to the current node.

The deformation of the original active contour CAO makes it possible to generate a current active contour, denoted CAC, which is then subjected iteratively to the aforesaid convergent deformation so as to generate distinct successive current active contours as long as the displacement and the deformation do not satisfy the blocking condition for all the nodes of the contour.

The final active contour substantially reproduces the natural contour CN of the elementary object OBJ.

In FIG. 1a, represented in step C is the deformation operation described above for generating a current active contour.

Of course, in step B, that is to say immediately after the creation of the starting contour CD, and on the basis of the plot of the latter, and of the definition of the original active contour CAO, a calculation of the energy function E is carried out, this energy function being linked to the luminous intensity gradient calculated over the original active contour CAO, as will be described later in the description.

Likewise, in step C, the application of a convergent deformation by displacing at least one point or node of the original active contour CAO, makes it possible to calculate an energy variation $\Delta E$ of minimum elastic energy, for the current active contour CAC obtained through the deformation applied.

Step C can then be followed by a test step D consisting in verifying that the energy variation $\Delta E$ is a minimum.

Upon a positive response to the test D, the deformation process is re-engaged by iteration, by way of a return to step B, the current active contour CAC being however taken as original active contour CAO for the next iteration. In FIG. 1a, the iteration is initiated by step E, which is denoted:

CAO≡CAC.

Through this operation, it is indeed understood that the convergent deformation process applied on the basis of step B, in which the original active contour CAO has been replaced by the current active contour CAC of the previous iteration, can then be reapplied by way of step C and of step D which were described above.

The deformation process is then applied iteratively for as long as there is displacement, this allowing the successive current active contours to approach closer to the natural contour of the object CN.

Under these conditions, in a step F, all displacement being stopped, the current active contour CAC of the previous iteration corresponds to a final active contour which is none other than the natural contour of the object OBJ substantially.

A more detailed description of step B for defining, either an original active contour CAO from the starting contour CD, or if appropriate a current active contour CAC, will now be given in conjunction with FIG. 1b.

In a general manner, it is indicated that the set of the nodes of each active contour, original active contour CAO, respectively current active contour CAC, can advantageously be defined by polygonal modeling by sampling over the trace of the active contour, original active contour CAO, respectively current active contour CAC, as a function of the distance between consecutive nodes.

Figure 1B:
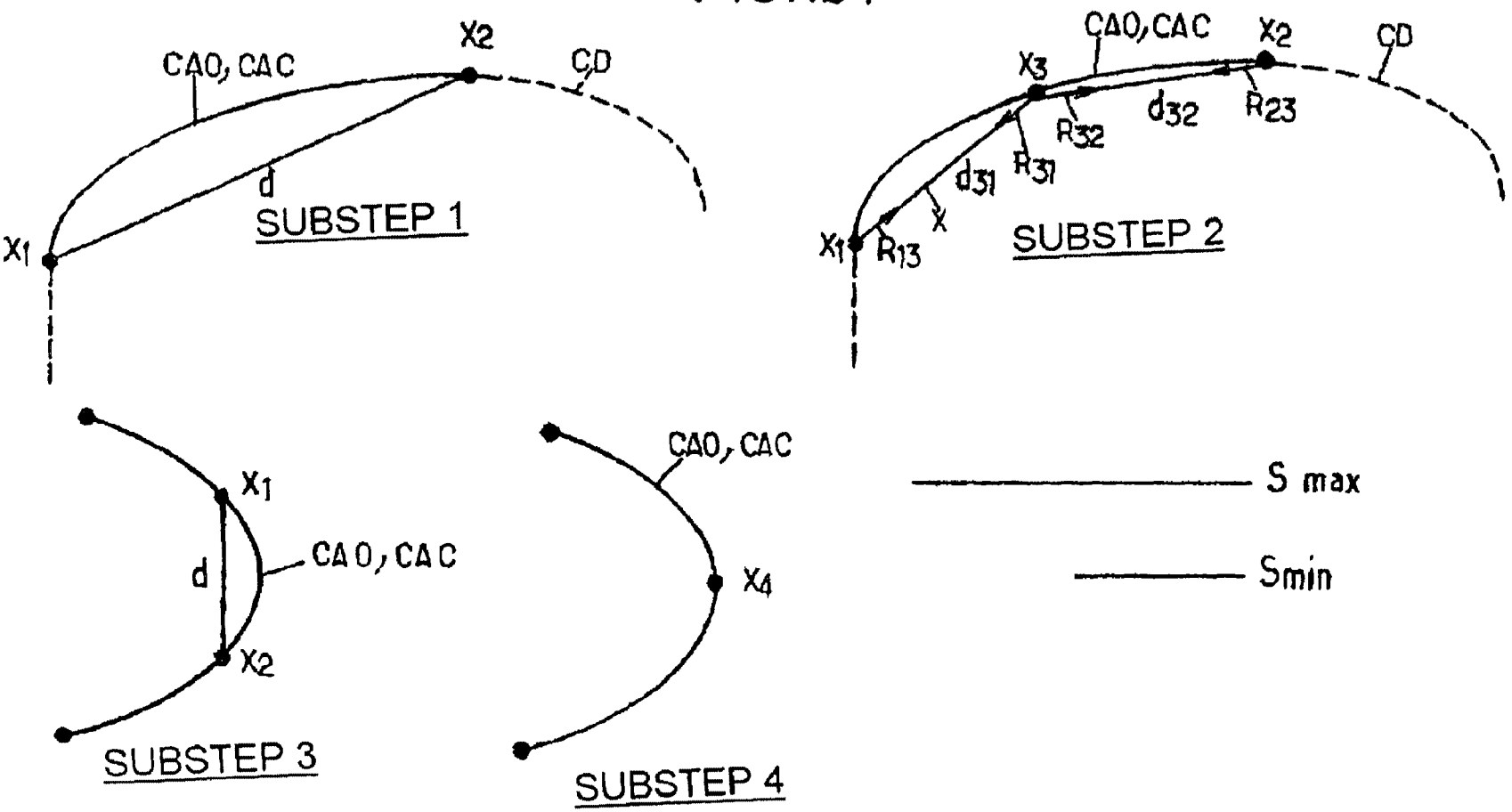
FIG. 1b represents, by way of illustration, a detail of implementation of the method which is the subject of the present invention illustrated in FIG. 1a and consisting in creating, from nodes defined on a starting contour, either an original active contour, or a current active contour.

Thus, with reference to FIG. 1b, and for a starting contour CD for example, intended to generate an original active contour CAO, two consecutive nodes, denoted $X_1$ and $X_2$ are considered, and the length of the segment d between the nodes $X_1$ and $X_2$ is measured. This operation is represented in substep 1. To preserve as node a node $X_2$ neighboring a first node $X_1$ as a function of the value of the aforesaid distance d, two threshold values Smax and Smin are introduced, satisfying the relation:

Smin<Smax and

Smin=Smax/2

It is indicated that, in a general manner, the aforesaid threshold values, designated polygonal sampling threshold values, can be defined by the user. However, and in a nonlimiting manner, the polygonal sampling threshold values can be effected in a substantially automatic manner on the basis of reference dimensions chosen as a function of the size of the elementary object.

If the length of the segment d exceeds the threshold value Smax, as represented in substep 2, then an intermediate node $X_3$ is added substantially in line with the middle of the segment d on the starting contour CD. The node $X_3$ is then taken into account and inserted between the nodes $X_1$ and $X_2$ so as to in fact construct the original active contour CAO, if appropriate the current active contour CAC.

However, and in a nonlimiting manner, more sophisticated sampling and polygonal modeling procedures can be implemented, such as interpolation or smoothing procedures (spline, by way of example), so as to add differential constraints on the original active contour, respectively the current active contour.

If conversely, the length of the segment d is less than the value Smin, the corresponding segment is then merged, the nodes $X_1$ and $X_2$ then being brought to a single resulting node $X_4$ represented in substep 4, positioned substantially in line with the middle of the segment of length d on the starting contour or on the original active contour CAO, respectively the current active contour CAC. An interpolated position other than that corresponding to the middle of the segment of length d can be used. Of course, the nodes $X_1$ and $X_2$ are then deleted and replaced by the single node $X_4$, as represented in substep 4.

The process of polygonal modeling by sampling as represented in substeps 1 to 4 of FIG. 1b is repeated for an original active contour CAO, respectively a current active contour CAC until the distance between two consecutive nodes of the set of nodes adopted to construct the original active contour CAO, respectively the current active contour CAC, lies in the interval defined by the polygonal sampling threshold values.

One thus has, as represented in substep 2, a current active contour CAC or an original active contour CAO modeled by the set of segments such as represented in FIG. 1b in the aforesaid substep, successive segments $d_{31}$, $d_{32}$, and so on and so forth over the entire plot of the original active contour, respectively of the current active contour.

A more detailed description of the mode of calculating the blocking function will now be given hereinbelow.

For an elementary zone of the image consisting of a rectangle comprising a specified number of pixels in the horizontal direction, respectively vertical direction, a luminous intensity gradient is calculated in the horizontal direction, respectively vertical direction, the luminous intensity gradient or luminance gradient satisfying relation (1):

$$GR\begin{cases} I_x(i,j) = \dfrac{I(i+1,j) - I(i-1,j)}{2} \\ I_y(i,j) = \dfrac{I(i,j+1) - I(i,j-1)}{2} \end{cases}$$

In the above relation, $I_x(i,j)$ denotes the value of the luminous intensity gradient or luminance gradient in the horizontal direction, and $I_y(i,j)$ denotes the value of the luminous intensity gradient in the vertical direction for any pixel with coordinates i, j in the relevant rectangular zone of pixels considered with respect to the adjacent pixels of address i+1, i−1, respectively j+1 and j−1.

The norm N of the gradient GR is then given by relation (2):

$$N = \sqrt{I_x^2(i,j) + I_y^2(i,j)}$$

based on the gradients in the aforesaid vertical and horizontal directions.

In accordance with a noteworthy aspect of the method which is the subject of the present invention, the force of an active contour is measured by the norm N of the gradient as calculated above.

To evaluate the force of an active contour, original active contour CAO, respectively current active contour CAC, for each node X of the active contour, the contributions of the luminous intensity gradient are evaluated respectively on the two segments adjacent to the relevant node, that is to say on the segments $d_{31}$ and $d_{32}$ for the successive nodes represented in substep 2 of FIG. 1b.

The aforesaid segments being defined solely by their two ends, the positions of the intermediate points are calculated on the image by the BRESENHAM algorithm.

For each node of a segment such as the nodes $X_1$, $X_3$ or $X_2$ represented in the aforesaid FIG. 1b, the contribution is sampled off from the set of gradient values GR stored, this set being designated the gradients map. The contribution for the relevant node is then weighted by a shape function which equals 1 on the current node and decreases linearly to the value 0 on the adjacent node. All the gradient contributions on the relevant segment are added up. The values associated with each segment are stored in a vector.

Thus, with reference to FIG. 1b, for substep 2, and for consecutive nodes $X_1$ and $X_3$ of the active contour which are separated by the segment $d_{31}$, the weighting function p relating to the current point x belonging to the polygonal modeling segment $d_{31}$ of the active contour CAO or CAC, satisfies relation (3):

$$p(X)=1-d(X,X_1)/d(X_3,X_1)$$

In the above relation, $X_1$ and $X_3$ are consecutive nodes, X denotes the current point belonging to the segment formed by X1 and X3, and d(Xa, Xb) denotes the distance between the nodes Xa and Xb.

The elastic energy function or functional representative of the distance separating each node from a neighboring node then satisfies relation (4):

$$E=k.\lfloor(X-X_p)^2+(X-X_s)^2\rfloor$$

In the above relation, X, Xp and Xs are respectively vectors of dimension 2 containing the coordinates of the current node, of the previous node and of the next node. k represents a stiffness term, the so-called spring term, corresponding to the elastic energy representative of the distance separating each node from a neighboring node.

Thus, a spring term, dependent on the derivative of the energy E, and corresponding to an energy variation ΔE is available for the relevant current node X on the original active contour CAO, respectively the current active contour CAC.

The spring term satisfies relation (5):

$$\vec{R}=k.[(X_p-X)+(X_s-X)]$$

In this relation, $X_p$, $X_s$ and X denote the same parameters as in the case of relation (4), k also denoting a stiffness constant.

The spring term $\vec{R}$ tends to minimize the energy E which is manifested as a smoothing, the force of which is weighted by the stiffness term k. This term is a regulating term which avoids degeneracies and which eliminates in particular the formation of folds.

It is indicated that the spring term $\vec{R}$ is an oriented quantity, supported by the segment joining two consecutive nodes and supported by it. In FIG. 1b the spring terms have been denoted $\vec{R}_{13}$, $\vec{R}_{31}$, $\vec{R}_{32}$, $\vec{R}_{23}$ in substep 2.

In accordance with a noteworthy aspect of the method which is the subject of the present invention, the deformation applied to each original active contour CAO, respectively current active contour CAC, is effected by a displacement of at least one of the constituent nodes of the original active contour, respectively of the relevant current active contour, having regard to a relation linking, on the one hand, the aforesaid spring term $\vec{R}$, the displacement proper, in a centripetal direction toward the elementary object and of course a luminous energy term linked to the gradient and designated as the contribution of the gradient on the original active contour CAO, respectively the current active contour CAC, as will be described hereinbelow.

For each node of the relevant active contour, original active contour CAO, respectively current active contour CAC, the value of the luminous intensity gradient is taken into account on the whole of each segment placed either side of the relevant node, the contribution G of the luminous intensity gradient GR on each relevant segment being evaluated on the basis of summation of the norm of the gradient weighted by the weighting function mentioned previously in the description.

Thus, the contribution of the gradient on a given segment, segment modeling the relevant active contour by polygonal modeling, then satisfies relation (6):

$$G=\sum_d p(x)\cdot N(x)$$

In the above relation, X, p(x) and N(x) respectively denote the current point, the weighting associated with this point X and the norm, calculated at this point, of the gradient.

Thus, in FIG. 1b, in substep 2, d takes the value d31 and X moves from node X1 to node X3 over the segment d31.

The relation linking the displacement constraint $\vec{F}$ applied at each node or at at least one node of the original active contour CAO, respectively of the current active contour CAC, will now be described when the displacement of the relevant node is effected in the direction N normal to the active contour at the level of the relevant node.

To calculate the direction normal to the relevant node, a heuristic is used, so as to assign a vector normal to the aforesaid active contour. With reference to FIG. 1b, and by way of nonlimiting example, for the node $X_3$ whose adjacent nodes are the nodes $X_1$ and $X_2$, the normal vector $N_1$ for the segment $d_{31}$ and the normal vector $N_2$ for the segment $d_{32}$ are calculated. The mean or resultant of the normalized normal vectors $N_1$ and $N_2$ yields the direction of the resultant normal vector $N_3$ at the node $X_3$. The value $N_3$ corresponding to a displacement vector $\vec{N}$ is then oriented toward the inside of the object, on the basis for example of a calculation of concavity of the plot supporting the original active contour CAO, respectively the current active contour CAC. Other modes of calculation based on spline interpolations or the like may be implemented for the estimation of the normal vector $\vec{N}$.

Thus, for any normal vector $\vec{N}$ and for a spring term $\vec{R}$, the displacement constraint $\vec{F}$ applied according to the displacement vector $\vec{N}$ at at least one of the nodes of the original active contour, respectively of the current active contour, is given by relation (7):

$$\vec{F}=(\vec{R}+\vec{N})\Pi(G<S)$$

In the above relation, it is indicated that the term Π(G<S) is a specific function such that this function is equal to 1 if G<S, and equal to 0 otherwise, S denoting a threshold value predefined by the user and G denoting the contribution of the gradient at the relevant node.

Thus, the aforesaid relation (7) defines the condition of blocking of the displacement of the nodes by the function Π(G<S). If this function is equal to 1, the displacement of the node or nodes of the current active contour by the resultant value $\vec{F}$ is carried out and if this function is equal to zero the displacement is halted.

Thus, if the contribution of the gradient G for the relevant current node is less than the aforesaid threshold value S, the node, and of course, if appropriate, the set of constituent nodes of the original active contour CAO, respectively of the current active contour CAC, is displaced by the value of the displacement constraint $\vec{F}$ in the centripetal direction defined for the relevant node.

A more detailed description of a preferred mode of implementation of the method which is the subject of the present invention will now be given in conjunction with FIG. 2a. In the aforesaid figure, the same steps, as defined in FIG. 1a, are denoted by the same references.

Figure 2A:
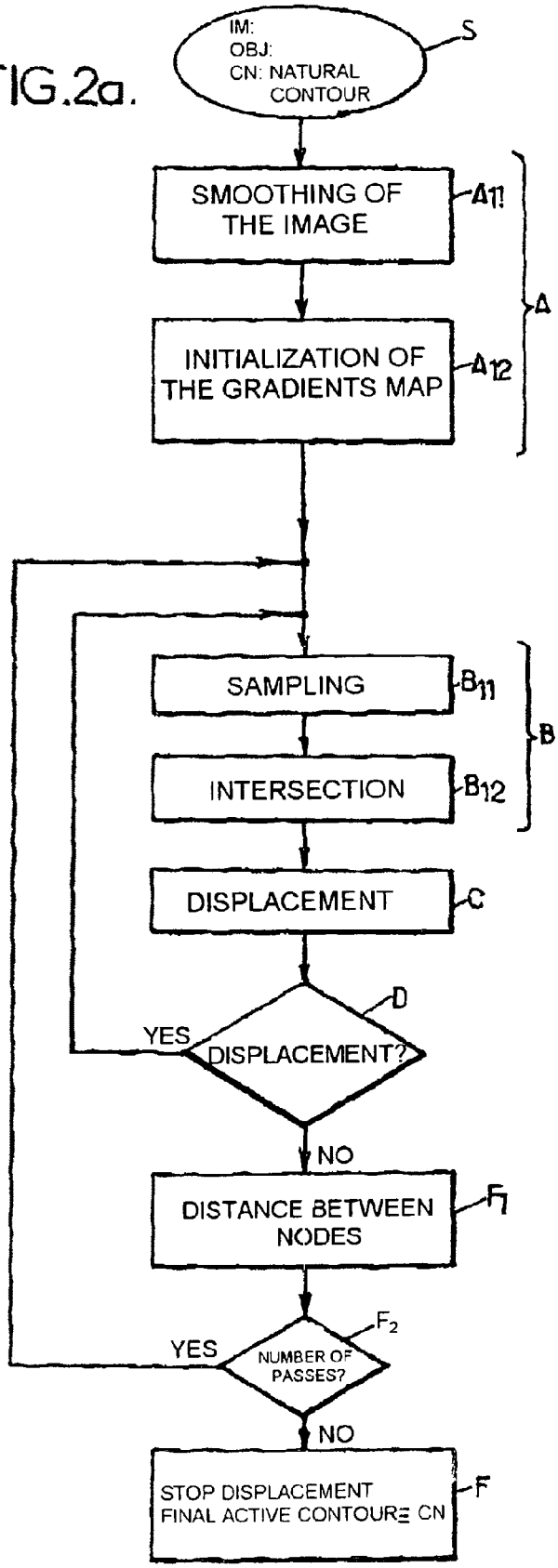
FIG. 2a represents, by way of illustration, a preferred nonlimiting mode of implementation of the method which is the subject of the present invention in which management of the existence of intersections and of the resolution applied to the current active contour is introduced.

As far as step A is concerned, which consists in defining a starting contour CD around the object OBJ, this step, as is represented in the aforesaid FIG. 2a, can advantageously comprise a substep $A_{11}$ consisting in an operation of smoothing the image by means of a filtering process. Thus, the current video image is filtered with the aim of limiting the ambient noise present in this image and of obtaining contours which are more spread. The filtering used can consist of a conventional filtering process for eliminating noise as a function of the nature of the constituent data of the image. For this reason, the filtering process will not be described in greater detail.

Substep $A_{11}$ can then be followed by a substep $A_{12}$ consisting, on the basis of the starting contour CD, of an initialization of the calculation of the gradient values for a specified zone of the image. It is understood in particular that in order to limit the calculation times, the gradient values given by relations (1) and (2) above are calculated only over the region enclosed by the starting contour CD, then by the successive current active contours until of course the current active contour CAC reaches the final active contour corresponding to the natural contour of the object. The calculation values for the norm of the gradient are then stored in a gradients map. The aforesaid values can be calculated as gray level or as color. By way of nonlimiting example, it is indicated that the gradients map is an image of floating values initialized to an arbitrary value for example.

Figure 2B:
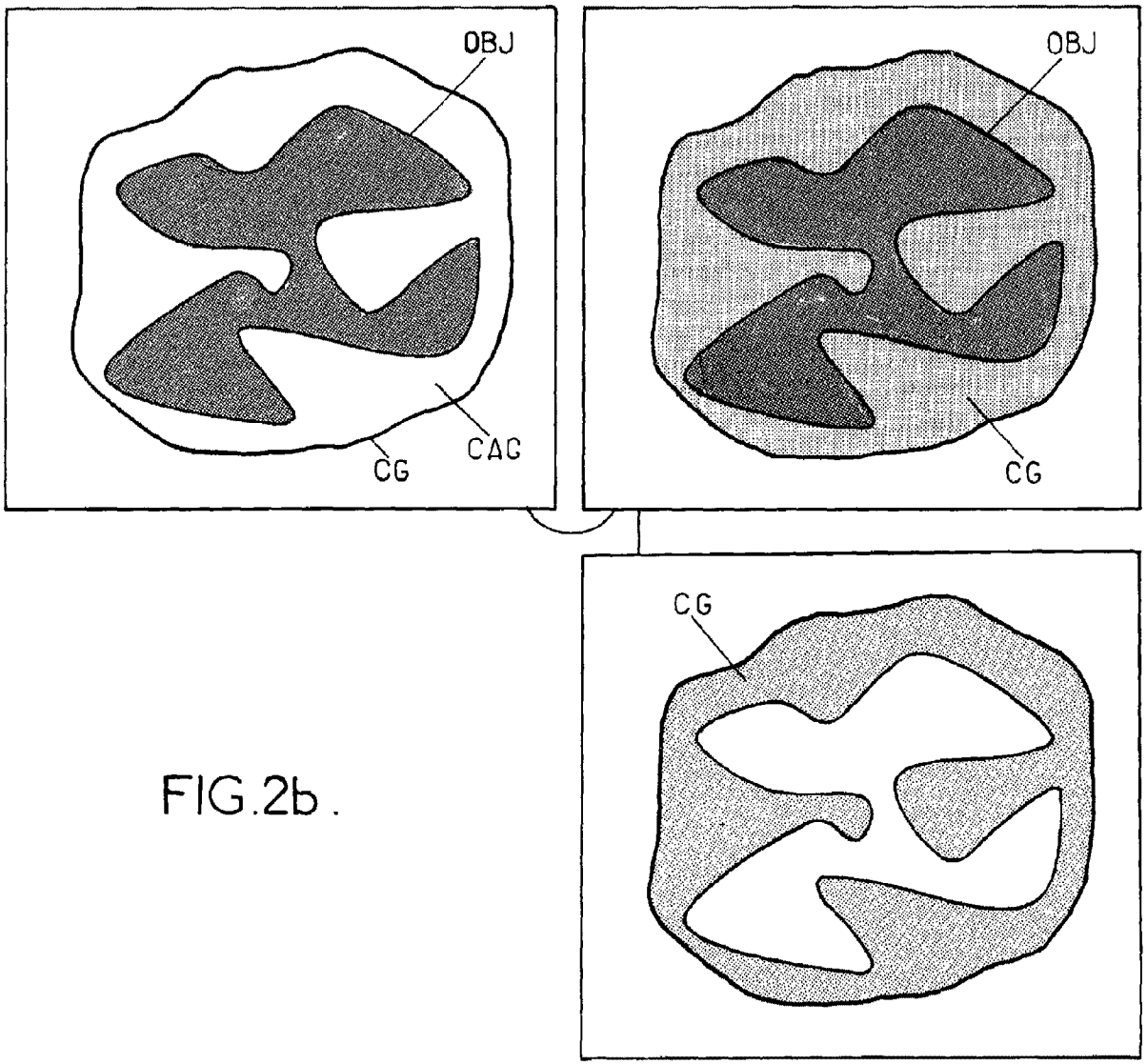
FIG. 2b represents, by way of illustration, a detail of the implementation of a step of the method which is the subject of the invention illustrated in FIG. 2a, in which an initialization of the domain of calculation of gradient of image intensity over each current active contour is carried out.

Represented in FIG. 2b are successive views on a display monitor of a video image comprising an object OBJ, an original active contour CAO or a current active contour CAC, and a zone in which the gradients map CG is calculated. It is understood in particular that the gradients map is calculated in a zone intermediate to the current active contour and to the natural contour of the object CN, this zone being represented shaded gray in FIG. 2b.

As far as step B of defining an original active contour CAO from the starting contour CD is concerned, it is indicated that this step can also be subdivided into a first substep $B_{11}$ consisting in performing the sampling for polygonal modeling of the relevant contour, as represented in FIG. 1b, substep $B_{11}$ possibly then advantageously being followed by a substep $B_{12}$ of detecting intersections on the active contour, original active contour CAO, respectively current active contour CAC. Substep $B_{12}$ can advantageously be implemented when the elementary object consists of an animate object in the image, and hence one which is capable of motion, of deformation and of partition, for any active contour capable of constituting a loop exhibiting at least one point of intersection following a partition, a deformation of this elementary object into elementary object components.

When an intersection is detected, the active contour, original active contour, respectively current active contour, is then split and grouped into a number of distinct active contours which is equal to the number of intersections plus one unit, so as to make it possible to assign a final active contour to each component of the aforesaid elementary object.

A specific modus operandi allowing the implementation of substep $B_{12}$ of detecting intersections will now be described in conjunction with FIG. 2c.

With reference to the aforesaid figure, it is indicated that an active contour evolves over time, on account of the modifications of shape or partition of the object, thereby causing loops possibly to appear within the active contour.

In a general manner, it is indicated that the auto-intersections of the active contour, original active contour CAO, respectively current active contour CAC, are measured over all the segments taken pair wise, the segments being formed between two consecutive nodes defining each active contour.

Thus, for A, B, C and D denoting four nodes constituting the segments AB and CD respectively, AB=A+r(B−A) and CD=C+s(D−C) are then obtained.

An intersection is then detected between the segments AB and CD if r and s belong to the interval [0, 1]. The values of r and of s are therefore calculated by means of the following relation (8):

$$r = \frac{(A_y - C_y)(D_x - C_x) - (A_x - C_x)(D_y - C_y)}{(B_x - A_x)(D_y - C_y) - (B_y - A_y)(D_x - C_x)}$$

$$s = \frac{(A_y - C_y)(B_x - A_x) - (A_x - C_x)(B_y - A_y)}{(B_x - A_x)(D_y - C_y) - (B_y - A_y)(D_x - C_y)}$$

In the above relation, the subscripts x and y associated with the letters A, B, C and D denote the ordinate and abscissa respectively of these letters.

Figure 2C:
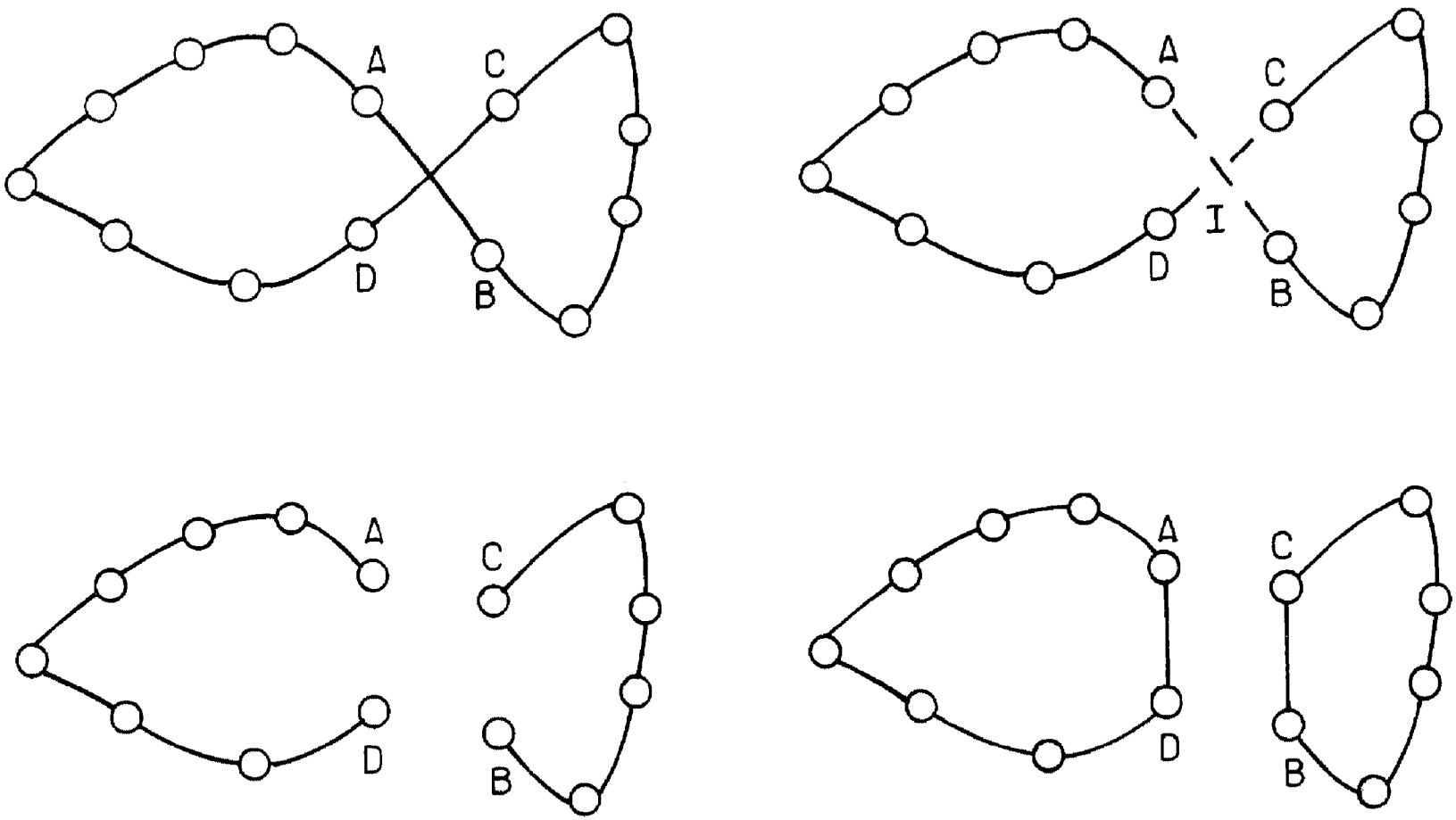
FIG. 2c represents, by way of illustration, a detail of specific implementation of a step of managing the existence of intersections over any current active contour.

In the case of the existence of an intersection between the nodes A, B and C, D in FIG. 2c, the current, respectively original, active contour is divided into several active contours according to the division rule cited above. In the case of the existence of an intersection, by way of nonlimiting example, at the node I belonging to the segments AB and CD in FIG. 2c, node A is disconnected from node B and the same holds for node C in relation to node D. Thereafter, node A and node C are connected to node D, respectively to node B. It is recalled that the concept of connection consists in constructing each active contour, original active contour, current active contour, in the form of a closed list of nodes.

The aforesaid step is a recursive process comprising the creation of a new active contour, the addition of the nodes lying between the nodes B and C in this new active contour and the simultaneous deletion of these same nodes from the current active contour. If the new active contour is not degenerate, that is to say if it comprises at least more than two nodes, then, it is stored in the form of a meta-snake representing a vector of active contours, the latter themselves being stored in the form of a list of nodes. An active contour is sensible to approximate the exterior contours of an object. The aforesaid recursive function is called again until there is no intersection. Different processes for intersection detection can be implemented without departing from the scope of the subject of the present invention.

Step D consisting in performing the test of minimum displacement can advantageously, as represented in FIG. 2a, upon a negative response to the aforesaid test, be followed by a step $F_1$ aimed at modifying the value of the resolution of definition of the current active contour CAC. Specifically, through an increase in the aforesaid resolution, resulting in a decrease in the inter-node distance and an increase in the number of constituent nodes of the relevant current active contour CAC, it is possible to recommence the process by way of a comparison step $F_2$ pertaining to the number of passes, a positive response to step $F_2$ allowing a return to step B on the basis of a current active contour CAC whose resolution has been increased in step $F_1$.

As far as the increase in resolution is concerned, in step $F_1$, it is indicated that the latter can be performed as described previously in the description in conjunction with FIG. 1b, and in particular by modifying the polygonal sampling threshold values Smax and Smin.

Conversely, on a negative response to the test step $F_2$, the step of stopping displacement of final active contour F is then called, the final active contour being presumed to correspond to the natural contour of the elementary object of interest.

A more detailed description of a process for tracking an elementary object consisting of an animate object moving in the image, allowing the implementation of the method which is the subject of the present invention will now be given in conjunction with FIG. 3a and the following figures.

In a general manner, it is indicated that the method which is the subject of the present invention must make it possible to follow or track the elementary object given the fact that the latter is capable of deforming, of rotating and, more generally, of moving in the course of time, that is to say from one image to the next, over a sequence of video images for example.

Within the framework of the implementation of the method which is the subject of the present invention, it is considered that the user has selected an elementary object of interest, that is to say that step B of FIG. 1a has been implemented, and, furthermore, that the acquisition of the elementary object of interest has been performed, that is to say that step F of FIG. 1a or 1b has been carried out, the final contour satisfactorily hugging the elementary object of interest.

As represented in FIG. 3a, the method which is the subject of the present invention then consists, in a so-called data preparation step G, carried out on the current image, by constructing the mask of the object delimited by the final active contour or a band, called a ring, encompassing the nodes of the relevant active contour, the ring being a difference of the regions encompassed by two dilatations of the active contour or by successive dilatations of a binary image initialized with this active contour.

Step G is itself followed by a step H consisting in performing on the ring, a motion estimation making it possible to displace the nodes of the active contour or the pixels of the ring according to an estimated motion vector.

A test I can be envisaged in such a way as to repeat the motion estimation, by return J to the motion estimation prior to step H. The test I can correspond for example in a motion estimation over a number greater than two images, for example, as a function of the user's choice, as will be described later in the description.

On a negative response to the test I, the estimation of the motion not being repeated, the motion vector or displacement vector is then applied to the relevant active contour, so as to make it possible to ensure the following of the moving elementary object by the final active contour and to discriminate the aforesaid moving elementary object, having regard to the motion of the latter in the next image. It is understood in particular that, for the next image, the method which is the subject of the present invention can be repeated so as to carry out step B of FIG. 1a or of FIG. 2a, then step C of deformation by displacement under blocking condition for all the nodes of the contour.

However, as represented in FIG. 3a, step H of estimation of motion can be implemented according to two substeps, a first substep $H_1$ of estimation of the motion proper applied to the dilated active contour, as mentioned previously, followed by a substep $H_2$ consisting in refining the segmentation of the image, that it is to say of the selection of the contour of the elementary object.

As far as the calculation of the estimation of the motion proper is concerned, the theoretical indications hereinbelow will be explained.

The motion estimation procedure proper, implemented in step $H_1$ for example, can be based on a multiresolution structure estimating the global motion of an object constituted by the current active contour CAC, by a translation model or an affine model. The multiresolution is obtained by successively filtering the images, this process making it possible to accelerate the convergence of the solution and rendering the latter more robust.

The transformation equations for a motion estimation model are as follows, and satisfy relation (9):

Translation:

$$\begin{cases} x' = x + dx \\ y' = y + dy \end{cases}$$

Amine Transformation:

$$\begin{cases} x' = a_1 x + a_2 x + a_3 \\ y' = a_4 x + a_5 y + a_6 \end{cases}$$

In the above relation, x and y denote the coordinates of a point M(x,y) of the current image, transformed owing to the motion of the elementary object into a point M'(x',y') with coordinates x' and y' in the next image, dx, dy denote the parameters of translation in the horizontal x, and vertical y directions for the translational transformation, and $a_1$, $a_2$, $a_3$, $a_4$, $a_5$, $a_6$ denote the affine transformation parameters making it possible to go from the current active contour of the current image to the current active contour of the next image owing to the displacement or deformation of the elementary object of interest.

As far as step G of data preparation is concerned, that is to say of defining the ring forming band from the current active contour or the final active contour segmenting the elementary object of interest, it is indicated that the aforesaid step can consist in generating a binary image calculated over the aforesaid ring encompassing the nodes of the aforesaid final active contour CAF. The previously mentioned ring can correspond to the difference of the regions encompassed by two dilatations of the final active contour CAF, these regions being definable with respect to the geometrical center of the active contour or to the center of gravity of the latter. Another possibility can consist in obtaining the aforesaid regions through successive dilatations of a binary image initialized on the basis of the relevant final active contour CAF.

Having regard to these indications, it is indicated that the data preparation carried out in step G can thus consist in establishing:

- the mask delimiting the region over which the estimation is carried out;
- the number of levels of the multiresolution used to execute the motion estimation;
- the type of estimation by affine transformation or translation.

The substep of refining the object contour selection carried out in substep $H_2$ can consist, as described in conjunction with FIG. 3b, following the estimation of the motion of the ring of the relevant active contour, the final active contour CAF for example, constituting a current active contour CAC in respect of the estimation of the motion, in displacing each node of this active contour CAC by the value of the estimated motion in a substep $H_{21}$, so as to generate an initial active contour for the new image. Represented in FIG. 3b is the final active contour forming in fact a current active contour CAC by a dashed circle, in a nonlimiting manner, so as not to overburden the drawing, the motion estimation having given rise to a displacement vector $\vec{D}e$ and the displacement being illustrated symbolically by the displacement of the center of the current active contour CAC, and of course of the latter's periphery. This displacement makes it possible to generate a displaced current active contour CACD at the end of step $H_{21}$. The displaced current active contour CACD thus constitutes an initial current active contour CACI for the next image.

Substep $H_{21}$ is then followed by a substep $H_{22}$ consisting in dilating the initial current active contour CACI by geometrical transformation, so as to generate a displaced and dilated current active contour CACDd constituting a reference initial active contour CAIR for this next image. The dilatation process is carried out by geometrical transformation, the geometrical transformation possibly consisting for example in a homothety with respect to the barycenter of the displaced current active contour CACD. The reference initial active contour CAIR thus obtained constitutes an original active contour of the elementary object for the next image in substep $H_{23}$, this of course making it possible to iteratively recommence the convergent deformation of the original active contour so as to generate the final current active contour for the aforesaid next image. It is thus understood that, following substep $H_{23}$ of FIG. 3b, it is then possible to call for example step B then step C of FIGS. 1a and 2a so as to ensure the segmentation of the object, in accordance with the method which is the subject of the present invention.

Figure 3C:
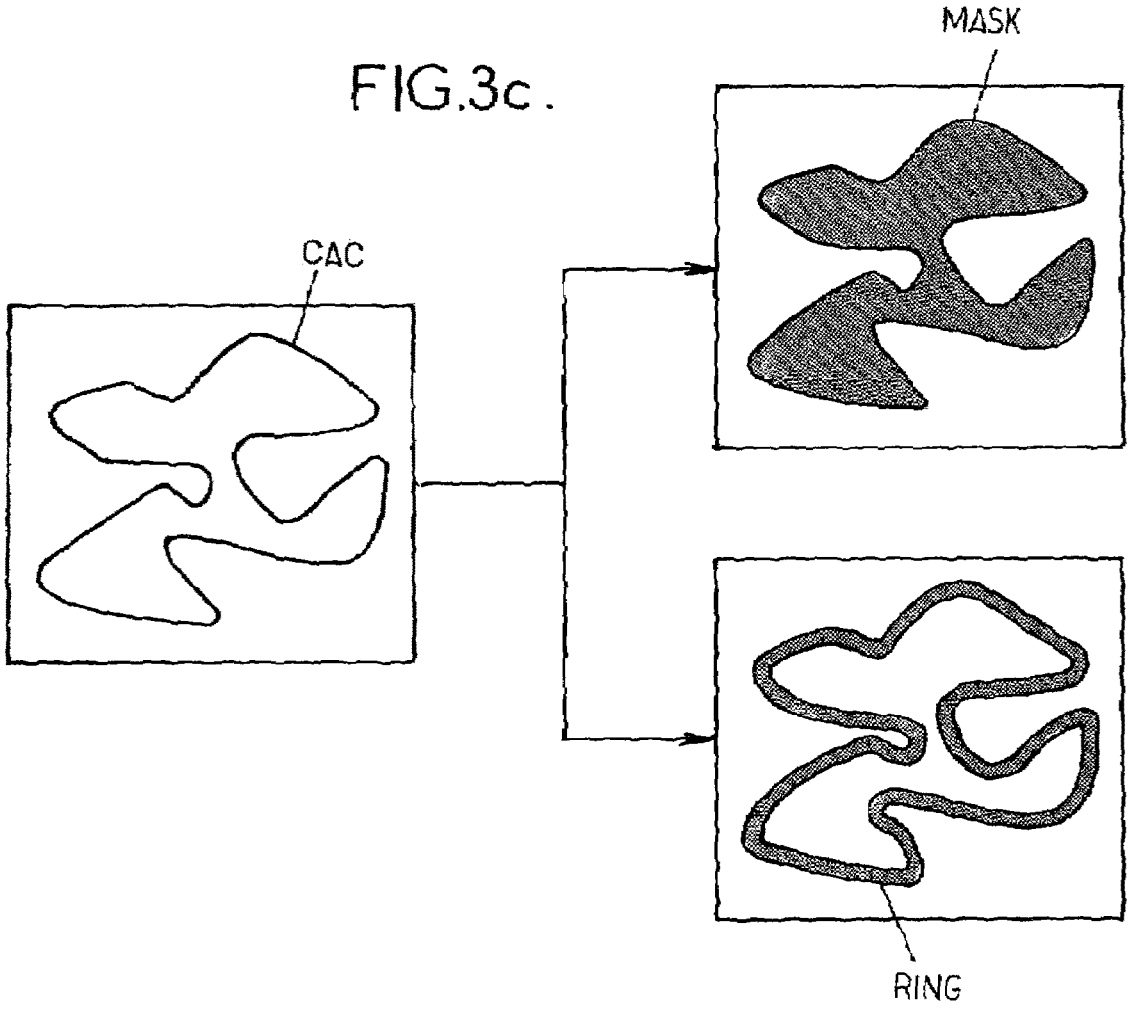
FIG. 3c shows, by way of illustration, the parts of the object on which the motion estimation is carried out.

Represented in FIG. 3c is any active contour, a mask consisting of a binary image and finally, the ring corresponding to successive dilatations of a binary image initialized with the active contour.

Figure 3D:
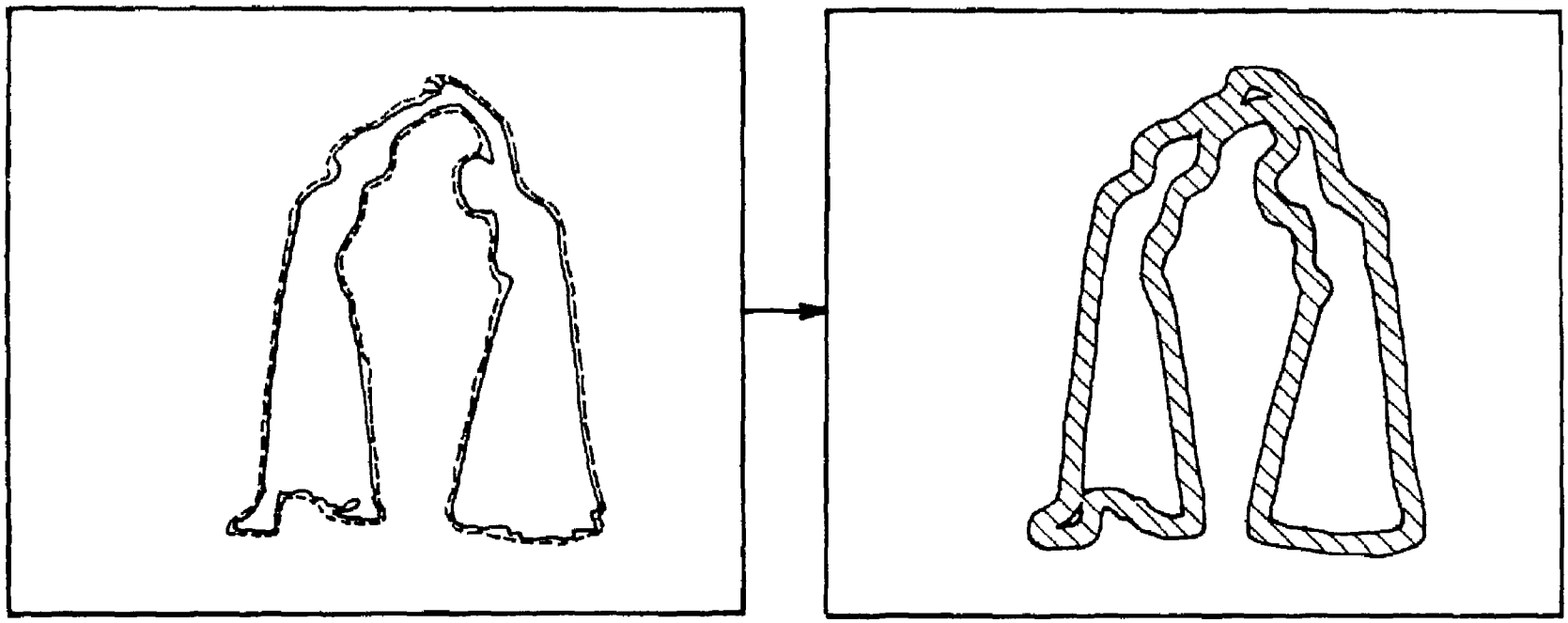
FIG. 3d is similar to FIG. 3c in a real example composed of two players acting a ballet scene.

Finally, represented in FIG. 3d is an elementary object of interest formed by two players acting a ballet scene, the final active contour CAF surrounding the two players then the ring obtained around them, by virtue of the implementation of step G of FIG. 3a.

Figure 4:
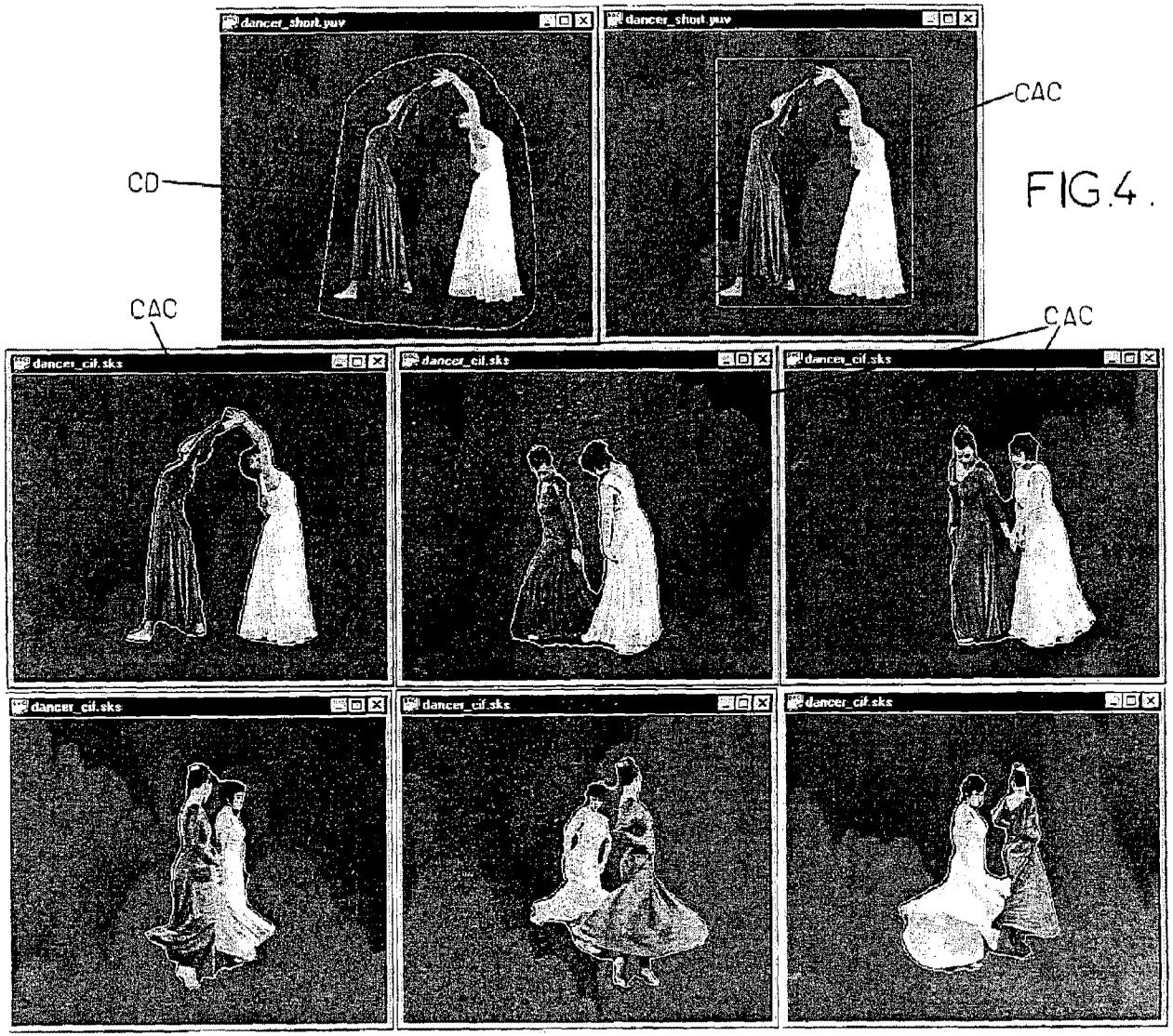
FIG. 4 represents, by way of illustration, a string of video images relating to a ballet scene played by two actors which shows the evolution of the current active contour and in which the final active contour splits into two, respectively unites into one.

Finally, FIG. 4 represents a ballet scene acted by the aforesaid two players. The first two images on top depict two possible selections of the players (mouse and encompassing box) encompassing the players and the other six images depict an instant of the temporal tracking of these players.

A description of a protocol for searching for an elementary object of interest in one or more video images stored in a database accessible through a server site on the basis of the segmentation method, which is the subject of the present invention, this search being conducted from a terminal for access to this server site, will now be given in conjunction with FIG. 5.

In a general manner, and with reference to the aforesaid figure, an access terminal, denoted TA, such as a terminal consisting of an office microcomputer, a portable microcomputer, a digital assistant of PDA type, or a mobile radio telephony terminal furnished with a display screen and with a graphical interface of WAP type for example, this mobile radio telephony terminal implementing a transmission of UMTS type for example, or GPRS type, and allowing the exchange of files with this server site are considered.

The terminal TA has available a sample, in fact consisting of a sample image denoted IECH, consisting of at least one sample video image emanating from the sequence of images or from the plurality of images stored in a database of the server SERV. The sequence of images stored in the database of this server in fact constitutes a sequence of reference images, denoted SIR, this sequence of images being presumed to comprise a plurality of current reference images IRC, each current reference image being followed by a next reference image, denoted IRS.

Figure 5:
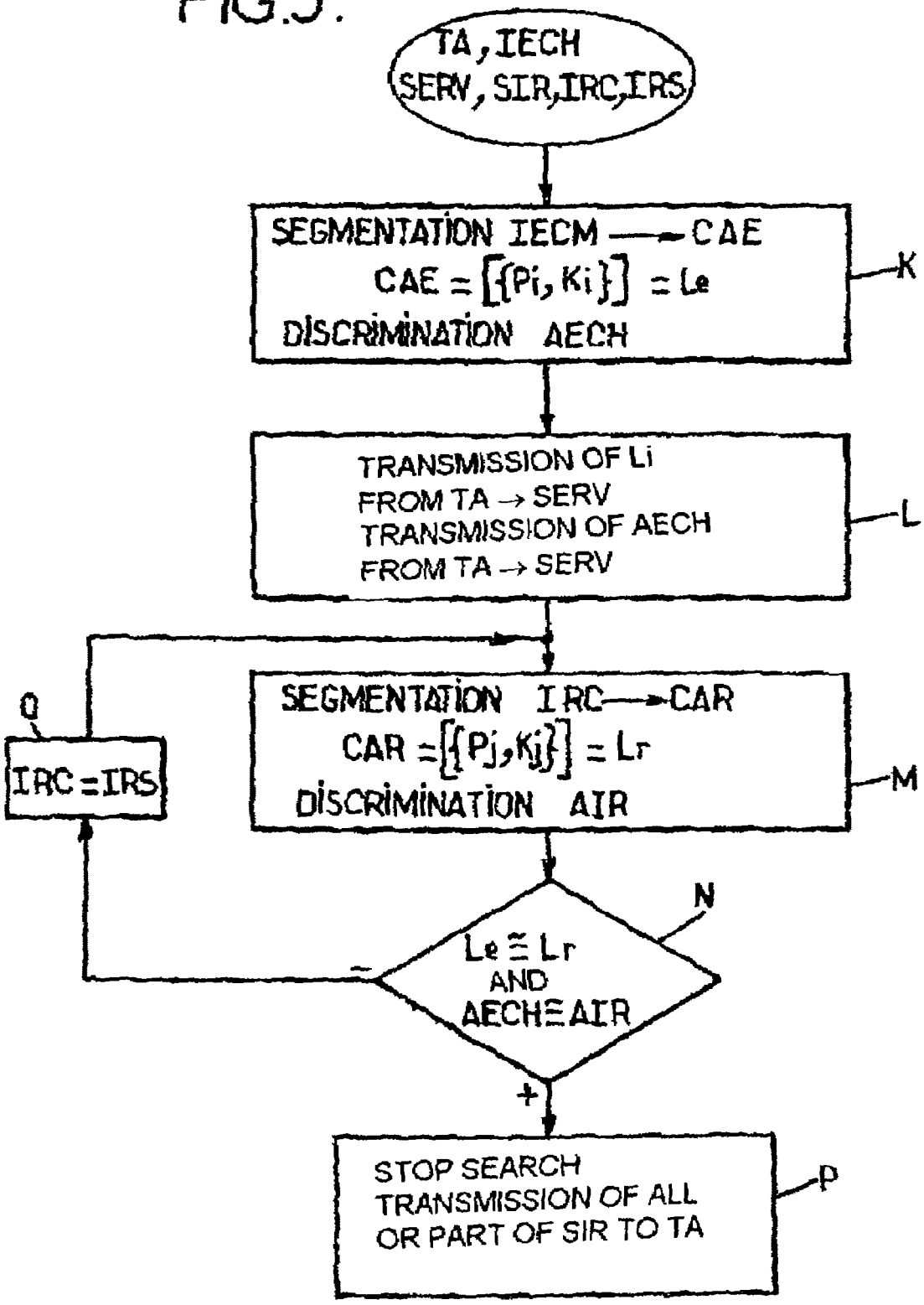
FIG. 5 represents, by way of illustration, a flowchart relating to a protocol for searching for an elementary object of interest in a sequence of images stored in a database accessible on a server site from an access terminal.

With reference to the aforesaid FIG. 5, the protocol for searching for an elementary object of interest, which is the subject of the present invention, consists, in a step K, in segmenting the sample video image IECH according to the method which is the subject of the present invention, as described previously in the description with reference to FIGS. 1 to 4. The aim of this segmentation is to generate at least one sample active contour. This sample active contour is for example a final active contour CAF, within the meaning of the method which is the subject of the present invention, and consisting of a list of nodes associated with the elementary object of interest belonging to the sample video image IECH. It is recalled that the list of nodes in fact constitutes a list of points distributed over the relevant active contour, final active contour, with each point there being associated moreover a value of stiffness constant representative of the elastic energy E, as mentioned previously in the description. For this reason, the sample active contour is denoted:

$$CAE=[\{P_i,K_i\}]=L_e$$

where $P_i$ denotes each point-of the active contour and $K_i$ denotes the stiffness constant associated with this point to an adjacent point.

Step K is then followed by a step L consisting in transmitting the list of nodes $L_e$ from the access terminal TA to the server site SERV.

The aforesaid step L is then followed by a step M consisting, at the server level, in segmenting at least one current image of the sequence of images stored in the database, this segmentation of course being performed in accordance with the segmentation method which is the subject of the invention described previously in the description. The aforesaid segmentation operation is denoted segmentation IRC, so as to generate CAR, this operation of course making it possible to generate at least one reference active contour, denoted CAR.

The reference active contour is denoted:

$$CAR=[\{P_j,K_j\}]=L_r$$

It is of course understood that the list $L_r$ constitutes the reference active contour, which is presumed to consist of the points $P_j$ of this active contour and the stiffness term $K_j$ which is associated with each of these points.

Step M is then itself followed by a step N consisting of a comparison test step by comparison of similarity of the sample active contour $L_e$ with the reference active contour of the list $L_r$, denoted $L_e \cong L_r$.

By comparison of similarity is meant a term-by-term comparison of the coordinates of the points $P_i$ and $P_j$ distributed over the sample active contour CAE, respectively over the reference active contour ACAR, and of course by comparison of the corresponding stiffness terms $K_i$ and $K_j$, the comparison can be carried out with a confidence interval, in such a way as to introduce a comparison of fuzzy logic type making it possible to modulate the decision.

On a negative response to the test carried out in the comparison step N, the sample list and the sample active contour not being able to be identified satisfactorily with the reference list $L_r$ and with the reference active contour CAR, the search is continued over the next reference image IRS by returning to the segmentation step M, to the value of the current image IRC there being allocated however the value of the next image IRS through the equality IRC=IRS.

Conversely, upon comparison of similarity, the sample list and the sample active contour CAE being able to be identified with the reference list $L_r$ and with the reference active contour CAR, the test comparison step N is followed by a step P consisting in stopping the search and in transmitting, if necessary, on request from the terminal TA, all or part of the sequence of images stored in the database accessible on the server site SERV.

The protocol which is the subject of the present invention can be improved in so far as, with each sample active contour CAE, and on the other hand, with each reference active contour CAR, can be associated various attribute parameters of the elementary object which is the subject of the search, so as to improve the object recognition performance.

With this aim, as represented also in FIG. 5, the protocol which is the subject of the present invention can comprise steps consisting in discriminating, in the object of interest, sample object component attributes, denoted AECH, attributes such as color, texture, motion parameters, etc. of the elementary object of interest in the relevant sample image. Specifically, while the sample active contour CAE is available, the final active contour CAF and, consequently, the natural contour of the object in question, is necessarily available. It is then particularly easy to calculate, in this natural contour, the aforesaid attributes on the basis of image processing and analysis procedures.

Furthermore, in step L, the sample object component attributes AECH are transmitted from the access terminal TA to the server site SERV.

Furthermore, in step M, the protocol which is the subject of the present invention can consist in discriminating, in the object delimited by the reference active contour, reference object component attributes of the same type as those of the sample object component attributes. The reference object component attributes are denoted AIR and correspond in the same way to attributes such as texture, color, color temperature or the like, in the object delimited by the reference active contour.

Step M is then followed by a step N in which the reference object component attributes AECH and the sample object component attributes AIR are furthermore compared so as to instruct the stoppage, respectively the continuation of the search. It is understood in particular that this instruction can be carried out by a coupling by an AND function of the comparison of the sample list and of the sample active contour with the reference list and with the reference active contour with the comparison of the sample attributes with the reference object component attributes.

Of course, the comparison in respect of the aforesaid attributes can be carried out having regard to a confidence span, so as to introduce a fuzzy logic decision, as mentioned previously in the description.

As far as the implementation of the step M of segmenting the current reference image is concerned, it is indicated that the case where this image comprises several elementary objects of interest does not constitute an obstacle to the implementation of the protocol which is the subject of the present invention, in so far as, in such a case, it is possible to provide arbitrarily for a starting active contour CD substantially surrounding the entire image at its periphery, the method which is the subject of the present invention allowing a segmentation into several elementary objects of interest when the latter are disjoint. Consequently, and independently of the choice in the sample image IECH of an elementary object of interest by the user, there thus always exists, in each current reference image IRC, a reference elementary object corresponding substantially to the object chosen by the user in the sample image IECH.

The protocol which is the subject of the present invention thus appears to be particularly well suited to the implementation of a search for an image in video image sequences in the MPEG 4 Standard for example.

The invention claimed is:

1. A method for segmenting a video image based on elementary objects, comprising, with regard to at least one elementary object delimited by a natural contour of the video image, the steps of:

defining, around the elementary object, a starting contour arbitrarily and completely surrounding said elementary object;

defining, on the basis of said starting contour, an original active contour, formed by a set of nodes distributed on the starting contour, each node being formed by a point belonging to the starting contour and by an elastic energy function representative of the distance separating the node from a neighbouring node;

subjecting, with regard to a set of reference values representing the natural contour of said elementary object, said original active contour to a convergent deformation, by displacing toward the natural contour of the elementary object at least one of the nodes of the original active contour, so as to generate a current active contour, the current active contour being subjected iteratively to said convergent deformation to generate distinct successive current active contours as long as said displacement satisfies the non-blocking condition and in halting any nodal displacement of said current active contour otherwise, generating a final current active contour substantially reproducing the natural contour of said elementary object.

2. The method as claimed in claim 1, wherein the set of nodes of each active contour is defined by polygonal modeling by sampling over the trace of the active contour as a function of the distance between consecutive nodes, thereby adapting the resolution of definition of each of the successive active contours.

3. The method as claimed in claim 1, wherein said convergent deformation comprises:

in calculating at each of the nodes of the current active contour a vector normal to the active contour;

in subjecting at least one of the nodes of said active contour to a centripetal displacement in the direction of said normal vector associated with said node.

4. The method as claimed in claim 1, wherein said set of reference values comprises a set of values of image intensity gradient, calculated over said active contour.

5. The method as claimed in claim 1, comprising, for said elementary object being constituted by an animate object in the image, which animate object is capable of motion, of deformation and of partition, for any active contour capable of constituting a loop exhibiting at least one point of intersection subsequent to a partition of said elementary object into components of elementary objects, the steps of:

detecting the existence on said active contour of at least one intersection;

splitting/grouping said active contour into a number of distinct active contours equal to the number of intersections plus one unit, thereby assigning a final active contour to each component of said elementary object.

6. The method as claimed in claim 1, comprising, for said elementary object being constituted by an animate object moving in the image, for at least two successive video images, the steps of:

defining on each final active contour of each image a band, forming a ring, encompassing the set of nodes belonging to said active contour;

performing between points of said ring an estimation of motion of the elementary object from the image to the next image, thereby defining a motion vector over the nodes of said active contour; and applying, at each node of said active contour, said motion vector, to the next image, thereby tracking the moving elementary object by said final active contour and discriminating said moving elementary object having regard to the motion of the latter.

7. The method as claimed in claim 6, comprising, with the aim of refining the segmentation of the image, subsequent to the estimation of the motion of the ring of the active contour, the steps of:

displacing each node of the active contour by the value of the estimated motion so as to generate an initial active contour for the new image;

dilating the initial active contour, by geometrical transformation, so as to generate a reference initial active contour for the new image, said reference initial active contour constituting an original active contour of the object; and iteratively recommencing the convergent deformation of said original active contour, so as to generate said final current active contour.

8. A protocol for searching for an elementary object of interest in a sequence of images stored in a database accessible on a server site, from a terminal for access to the server site, the access terminal being furnished with a sample consisting of at least one sample video image emanating from the sequence of images, comprising the steps of:

segmenting said sample video image following the method which is the subject of the present invention according to claim 1, so as to generate at least one sample active contour constituted by a list of nodes associated with said elementary object of interest belonging to the sample video image;

transmitting said list of nodes from said terminal for access to said server site;

segmenting at least one current image of said sequence of images stored in said database following the method according to claim 1, so as to generate at least one reference active contour; and comparing, by comparison of similarity, said sample active contour with said reference active contour and, on comparison of similarity, stopping the search so as to ensure the transmission of all or part of said sequence of stored images to said access terminal, and continuing the search over every image following said current image in said sequence of stored images otherwise.

9. The protocol as claimed in claim 8, furthermore comprising the steps of:

discriminating, in said object of interest, sample object component attributes such as color, texture, motion parameters, in said sample video image;

transmitting said object component attributes from said access terminal to said server site;

discriminating, in the object delimited by said reference active contour, reference object component attributes of the same type as those of the sample object component attributes; and comparing the reference object component attributes and the sample object component attributes so as to instruct the stoppage, respectively the continuation of the search.

*10. A method of segmenting a video image based on elementary objects, wherein at least one elementary object is delimited by a natural contour of the video image, the method comprising:*

*defining by a computing device, around the elementary object, a starting contour arbitrarily and completely surrounding said elementary object;*

*defining by the computing device, on the basis of said starting contour, an original active contour, formed by a set of nodes distributed on the starting contour, each node being formed by a point belonging to the starting contour and by an elastic energy function representative of the distance separating the node from another node of the set of nodes; and*

*subjecting by the computing device, with regard to a set of reference values representing the natural contour of said elementary object, said original active contour to a convergent deformation, by displacing toward the natural contour of the elementary object at least one of the nodes of the original active contour, so as to generate a current active contour, the current active contour being subjected iteratively to said convergent deformation to generate distinct successive current active contours as long as said displacement satisfies a non-blocking condition and in halting any nodal displacement of said current active contour otherwise, generating a final current active contour substantially reproducing the natural contour of said elementary object.*

*11. The method of claim 10, wherein the set of nodes of each active contour is defined by polygonal modeling by sampling over a trace of the active contour as a function of the distance between consecutive nodes, thereby adapting a resolution of definition of each of the successive active contours.*

*12. The method of claim 10, wherein subjecting a contour to a convergent deformation comprises:*

*calculating at each of the nodes of an active contour a vector normal to the current active contour;*

*subjecting at least one of the nodes of the active contour to a centripetal displacement in the direction of said normal vector associated with said node.*

*13. The method of claim 10, wherein said set of reference values comprises a set of values of image intensity gradient (GR).*

*14. The method of claim 13, wherein the video image comprises an elementary zone including a horizontal number of pixels and a vertical number of pixels, wherein each particular pixel includes a coordinate (i, j), wherein i is a horizontal coordinate of the particular pixel and j is a vertical coordinate of the particular pixel, wherein the GR satisfies at least the following equations:*

$$I_x(i,j)=(I(i+1,j)-I(i-1,j))/2$$

$$I_y(i,j)=(I(i,j+1)-I(i,j-1))/2$$

*wherein $I(i+1,j)$ is an intensity of a pixel adjacent to the particular pixel on one side in a horizontal direction, $I(i-1,j)$ is an intensity of a pixel adjacent to the particular pixel on another side in the horizontal direction, $I(i,j+1)$ is an intensity of a pixel adjacent to the particular pixel on one side in a vertical direction, $I(i,j-1)$ is an intensity of a pixel adjacent to the particular pixel on another side in the vertical direction, $I_x(i,j)$ is a value of the GR in the horizontal direction, and $I_y(i,j)$ is a value of the GR in the vertical direction.*

*15. The method of claim 14, wherein a Norm N of the GR is given by the following equation:*

$$N=\text{Square Root}[I_x^2(i,j)+I_y^2(i,j)].$$

*16. The method of claim 10, wherein said elementary object constitutes an animate object in the image, which animate object is capable of motion, of deformation and of partition, for any active contour capable of constituting a loop exhibiting at least one point of intersection subsequent to a partition of said elementary object into components of elementary objects, and the method further comprises:*

*detecting by the computing device, existence on a current active contour of at least one intersection; and*

*splitting, by said computing device, a current active contour into a number of distinct active contours equal to the number of intersections plus one unit, thereby assigning a final active contour to each component of said elementary object.*

*17. The method of claim 10, wherein said elementary object constitutes an animate object in the image, moving for at least two successive video images, and the method further comprises:*

*defining by the computing device, on each final active contour of each image, a band forming a ring and encompassing the set of nodes belonging to the final active contour;*

*performing by the computing device, between points of said band an estimation of motion of the elementary object from the image to a next video image, thereby defining a motion vector over the nodes of the final active contour; and*

*applying by the computing device, at each node of the final active contour, said motion vector, to the next video image, thereby tracking the moving elementary object by the final active contour and discriminating said moving elementary object having regard to the motion of the elementary object.*

*18. The method of claim 17, further comprising refining by the computing device the segmentation of the image, subsequent to the estimation of the motion of the ring of the final active contour, the refining comprising:*

*displacing by the computing device, each node of the final active contour by the value of the estimated motion so as to generate an initial active contour for the new image;*

*dilating by the computing device, the initial active contour, by geometrical transformation, so as to generate a reference initial active contour for the new image, said reference initial active contour constituting an original active contour of the object; and*

*iteratively performing the convergent deformation of said original active contour, so as to generate a final current active contour for the new image.*

*19. An apparatus configured to segment a video image based on elementary objects, wherein at least one elementary object is delimited by a natural contour of the video image, the apparatus comprising:*

*a processor; and*

*a data store coupled to the processor, and having stored therein computer-implemented application programs that if executed by the processor, cause the apparatus to perform the following actions:*

*defining, around the elementary object, a starting contour arbitrarily and completely surrounding said elementary object;*

*defining, on the basis of said starting contour, an original active contour, formed by a set of nodes distributed on the starting contour, each node being formed by a point belonging to the starting contour and by an elastic energy function representative of the distance separating the node from another node of the set of nodes; and*

*subjecting, with regard to a set of reference values representing the natural contour of said elementary object, said original active contour to a convergent deformation, by displacing toward the natural contour of the elementary object at least one of the nodes of the original active contour, so as to generate a current active contour, the current active contour being subjected iteratively to said convergent deformation to generate distinct successive current active contours as long as said displacement satisfies a non-blocking condition and in halting any nodal displacement of said current active contour otherwise, generating a final current active contour substantially reproducing the natural contour of said elementary object.*

*20. The apparatus of claim 19, wherein said elementary object constitutes an animate object in the image, which animate object is capable of motion, of deformation and of partition, for any active contour capable of constituting a loop exhibiting at least one point of intersection subsequent to a partition of said elementary object into components of elementary objects, and wherein the programming instructions if executed, further cause the apparatus to perform following actions:*

*detecting existence on an active contour of at least one intersection; and*

*splitting the active contour into a number of distinct active contours equal to the number of intersections plus one unit, thereby assigning a final active contour to each component of said elementary object.*

*21. The apparatus of claim 19, wherein said elementary object constitutes an animate object in the image, moving for at least two successive video images, and wherein the programming instructions if executed, further cause the apparatus to perform following actions:*

*defining on each final active contour of each image a band, forming a ring, encompassing the set of nodes belonging to the final active contour;*

*performing between points of said ring an estimation of motion of the elementary object from the image to a next video image, thereby defining a motion vector over the nodes of the final active contour; and*

*applying, at each node of said active contour, said motion vector, to the next video image, thereby tracking the moving elementary object by the final active contour and discriminating said moving elementary object having regard to the motion of the elementary object.*

*22. An article of manufacture comprising:*

*non-transitory computer-readable media; and*

*instructions encoded thereon and configured to cause an apparatus, when the instructions are executed by a processor of the apparatus, to segment a video image based on elementary objects, wherein at least one elementary object delimited by a natural contour of the video image, and wherein segmenting a video image includes:*

*defining, around the elementary object, a starting contour arbitrarily and completely surrounding said elementary object;*

*defining, on the basis of said starting contour, an original active contour, formed by a set of nodes distributed on the starting contour, each node being formed by a point belonging to the starting contour and by an elastic energy function representative of the distance separating the node from another node of the set of nodes; and*

*subjecting, with regard to a set of reference values representing the natural contour of said elementary object, said original active contour to a convergent*

*deformation, by displacing toward the natural contour of the elementary object at least one of the nodes of the original active contour, so as to generate a current active contour, the current active contour being subjected iteratively to said convergent deformation to generate distinct successive current active contours as long as said displacement satisfies a non-blocking condition and in halting any nodal displacement of said current active contour otherwise, generating a final current active contour substantially reproducing the natural contour of said elementary object.*

*23. The article of claim 22, wherein said elementary object constitutes an animate object in the image, which animate object is capable of motion, of deformation and of partition, for any active contour capable of constituting a loop exhibiting at least one point of intersection subsequent to a partition of said elementary object into components of elementary objects, and wherein the programming instructions when executed by the processor of the apparatus, further cause the apparatus to perform following actions:*

*detecting existence on an active contour of at least one intersection; and*

*splitting the active contour into a number of distinct active contours equal to the number of intersections plus one unit, thereby assigning a final active contour to each component of said elementary object.*

*24. The apparatus of claim 22, wherein said elementary object constitutes an animate object in the image, moving for at least two successive video images, and wherein the programming instructions when executed by the processor of the apparatus, further cause the apparatus to perform following actions:*

*defining on each final active contour of each image a band, forming a ring, encompassing the set of nodes belonging to the final active contour;*

*performing between points of said ring an estimation of motion of the elementary object from the image to a next video image, thereby defining a motion vector over the nodes of the final active contour; and*

*applying, at each node of said active contour, said motion vector, to the next video image, thereby tracking the moving elementary object by the final active contour and discriminating said moving elementary object having regard to the motion of the elementary object.*

*25. A system configured to segment a video image based on elementary objects, wherein at least one elementary object is delimited by a natural contour of the video image, the system comprising:*

*means for defining, around the elementary object, a starting contour arbitrarily and completely surrounding said elementary object;*

*means for defining, on the basis of said starting contour, an original active contour, formed by a set of nodes distributed on the starting contour, each node being formed by a point belonging to the starting contour and by an elastic energy function representative of the distance separating the node from another node of the set of nodes; and*

*means for subjecting, with regard to a set of reference values representing the natural contour of said elementary object, said original active contour to a convergent deformation by displacing toward the natural contour of the elementary object at least one of the nodes of the original active contour, so as to generate a current active contour, the current active contour being subjected iteratively to said convergent deformation to generate distinct successive current active contours as long as said displacement satisfies a non-blocking condition and in halting nodal displacement of said current active contour otherwise, generating a final current active contour substantially reproducing the natural contour of said elementary object.*

* * * * *